H. S. MYERS.
GEAR SHIFT.
APPLICATION FILED JAN. 31, 1922.
1,414,038.
Patented Apr. 25, 1922.
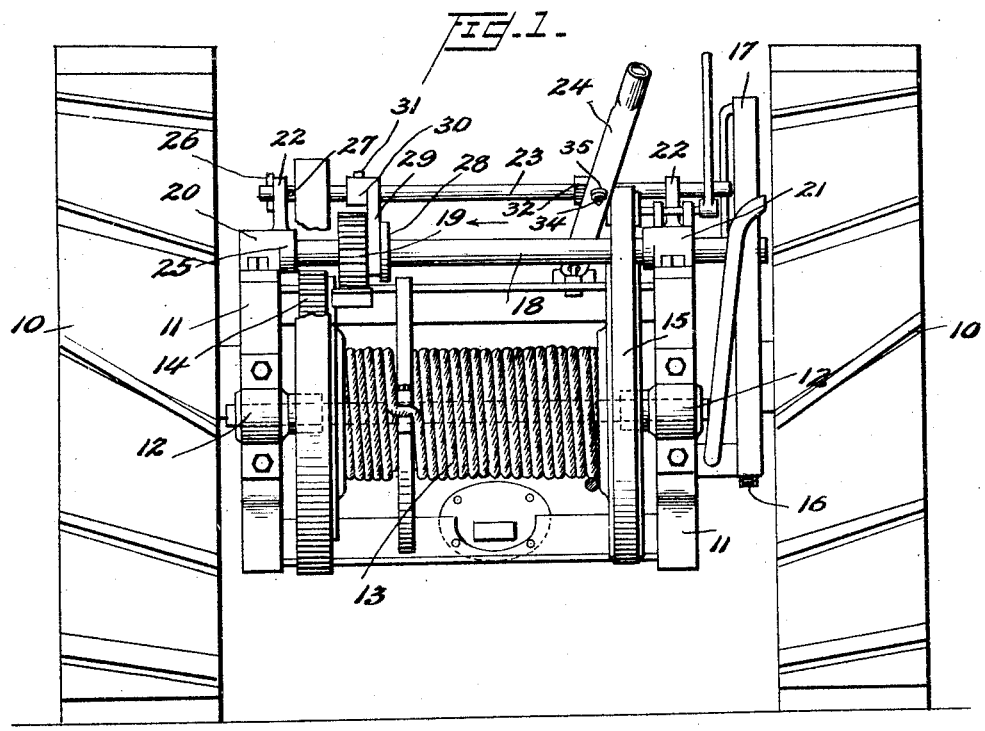
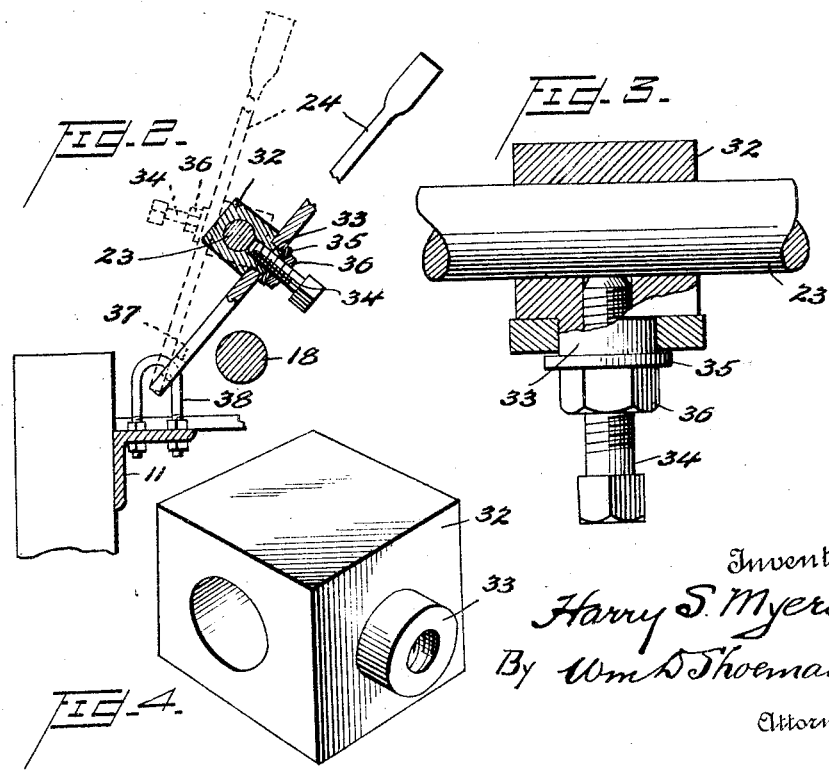

UNITED STATES PATENT OFFICE.

HARRY S. MYERS, OF VAN, PENNSYLVANIA.

GEAR SHIFT.

1,414,038.   Specification of Letters Patent.   Patented Apr. 25, 1922.

Application filed January 31, 1922. Serial No. 532,991.

*To all whom it may concern:*

Be it known that I, HARRY S. MYERS, a citizen of the United States, residing at Van, in the county of Venango and State of Pennsylvania, have invented certain new and useful Improvements in Gear Shifts, of which the following is a specification.

This invention relates to a gear shift of the type in which a pinion with a grooved collar is slidably keyed to a rotating shaft, and a sliding rod is mounted in parallelism with the rotating shaft, a yoke engaging the groove of the collar and carried by the sliding rod. It also relates to the means employed for shifting the rod of such a mechanism.

The particular adaptation selected for the purpose of illustration is a hoist attachment for a tractor in which the hoist is located at the rear of and between the wheels of the tractor, and in which the mechanism for shifting the gear is located out of the way of the operative parts of the tractor and hoist but within convenient reach of an operative of the hoist.

The object of the invention is to provide a gear shifting mechanism for a hoist attachment which will be out of the way of the operating parts of the hoist but which will still be within easy reach of an operative. Another object is the production of such a mechanism which will be easily operated, readily assembled requiring no adjustment, and efficient. Another object is the provision of a gear shift mechanism in which the parts are confined within the limits of width of the hoisting mechanism.

Another object of the invention is the provision in a gear shift of limiting stops. Another object is the production of an efficient swivel connection between the operating handle and the shift rod. A still further object of the invention is the provision of a simple lever which will at once be light in weight, strong and easily grasped by the hand of an operative without danger of injury.

Other objects and advantages of the invention will hereinafter appear in the following description and the novel features thereof will be particularly pointed out in the appended claims.

Like reference numerals indicate like parts throughout the several figures of the drawing, in which—

Figure 1 is a rear elevation of a hoist attachment for a tractor in which is incorporated a gear shift mechanism embodying the principles of my invention;

Figure 2 is a side elevation with parts in section of the operating lever and its connection with the slidable actuating rod, Figure 3 is a similar view upon an enlarged scale of the said connection, and Figure 4 is a perspective of one element thereof.

It will be understood that the invention may be varied in its details of construction and that the specific embodiment illustrated and described herein is only indicative thereof; the specific embodiment, however, is one which has been found to be practical in its construction and operation.

A clear understanding of the invention can best be conveyed by briefly outlining the elements of the hoist in which it has been shown as incorporated. Therefore, reference is had to Figure 1 of the drawing in which 10, 10, represent in outline the rear or tractive wheels of a motor driven vehicle. To the rear of such a vehicle is supported a hoist frame 11 carrying bearings 12, 12, for a drum 13, upon which is wound a supply of cable. The driving gear 14 is attached to one end of the drum and the brake 15 at the other.

The driving elements of the hoist with which the device of the present invention is associated are comprised in the main drive gear 16 (located under the guard 17) keyed to the drive shaft 18, upon which is slidably keyed the drive pinion 19 adapted to be brought into mesh with the gear 14.

The drive shaft 18 is mounted in bearings 20, 21, which have apertured ears 22, 22, projecting therefrom, into which is slidably mounted the rod 23. The lever 24 is provided to shift the rod 23 and cause the pinion 19 to be shifted into mesh with the gear 14.

I shall now proceed to a more specific description of that portion of the hoist just described in which the principles of my invention are incorporated. The several parts will be described in detail and their individual functions pointed out, after which a recital of their conjoint operation will be given.

The bearing 20 has a portion 25 extended beyond the framework 11, and its inner face lies in substantially the plane of the outer face of the gear 14. It will be seen therefore that in shifting the pinion 19 in the direction of the arrow, its outer face will abut the bearing extension 25, and its movement in this direction arrested. This bearing extension 25 therefore constitutes a limiting stop for the gear shift in one direction.

The ear 22 upon the bearing 20 projects upwardly from the inner end thereof. This ear slidably supports the rod 23 at one end, where the rod is provided with an aperture and pin 26. It will be seen that the movement of the rod 23 in the direction opposite to that of the arrow will be arrested by the pin 26 coming into contact with the ear 22.

The rod 23 is provided with a second aperture 27 and in the position of the parts shown in Figure 1 this aperture lies upon the side of the ear 22 opposite that of the pin 26. It will be seen that the insertion of a pin in this second aperture will lock the rod 23 against movement in the direction of the arrow. This is particularly desirable when the tractor is being driven from place to place and in the jolting of the vehicle there is liability of the gear being accidentally shifted into mesh with a possible resultant injury to the machine.

The reason for mounting the supporting ear 22 at the inner end of the bearing 20 is to permit of the shifting of the rod 23 therefrom without incurring any risk of its projecting far enough beyond the bearing 20 to engage any portion of the wheel 10.

The pinion 19 has integral with it the grooved collar 28 with which engages the yoke 29 carried by the rod 23. The yoke sleeve 30 is fastened to the rod 23 by means of a suitable set screw 31. It will be appreciated that a movement of the upper end of the lever 24 in the direction of the arrow will cause the rod 23 to be shifted to bring the pinion 19 into mesh with the gear 14. Reference is now had to Figures 2 to 4, inclusive, for a full and clear understanding of the construction of the lever and its associated parts. On the rod 23 is mounted the block 32 provided with a pivot lug 33, a screw threaded bore passing through the lug and block for the reception of a set bolt 34 designed to secure the block upon the rod. The pivot lug 33 forms a bearing for the lever 24, a suitable bearing aperture having been provided in the lever. To hold the lever upon the set bolt a washer 35 having an outer diameter in excess of that of the bearing aperture in the lever has been provided. The nut 36 clamps the washer to the outer face of the pivot lug. It will be appreciated that the nut 36 acts as a lock for the set bolt, and vice versa.

The lower end of lever 24 has a loose connection to a portion of the framework of the hoist. As best shown in Figure 2 this connection is formed by a loop bolt 36 secured in any suitable manner to a rail of the frame, a somewhat enlarged aperture 37 in the lower end of the lever receiving said loop bolt. The lever itself is formed of a piece of heavy strap iron and at its upper end it is provided with a handhold formed by flattening one end of a short length of pipe and welding this flattened end to the upper end of the piece of strap iron.

The dotted lines in Figure 2 show an alternative position which the lever and its associated parts may assume should it be desired to raise the gear shifting lever, but the position in full lines has been found to be generally satisfactory.

From the foregoing description of the mechanism, its operation should be plain. An operative has only to grasp the handhold of the lever 24 and throw it over in the direction of the arrow when the rod 23 will be shifted toward the left. The yoke 29 moving with the rod 23 slides the pinion 19 upon the shaft 18 into mesh with the gear 14. The bearing extension 25 will bring the pinion 19 to rest at the point of full mesh.

A movement of the lever in the opposite direction now will cause the unmeshing of the pinion 19 and gear 14. The rod 23 in this movement will come to rest when the pin 26 abuts the ear 22 of the bearing 20. If at any time it is desired to lock the hoist elements against operation, it is only necessary to insert a pin in the aperture 27 of the rod 23 while the parts are in the position shown in Figure 1, when it will be impossible to move the rod in either direction.

The mounting of the lever upon the framework of the hoist and the special connection between the lever 24 and rod 23 assist materially in the efficient and easy operation of the shift. In the welding of the handhold upon the end of the lever, I have provided a particularly useful feature.

Having described my invention, what I claim as new and desire to secure by Letters Patent is:

1. In a hoist attachment comprising a pair of spaced frame members supporting a winding drum therebetween, a shaft bearing and an associated rod bearing carried by each of said frame members, a drive shaft and a sliding rod mounted in said bearings, a drive pinion slidably keyed to said drive shaft and connected to move with said rod, and a lever pivoted to the frame of said attachment between said spaced frame members and to the rod between said rod bearings.

2. In a hoist attachment, a frame comprising spaced members supporting shaft and rod bearings, a drive shaft and a sliding rod mounted in said bearings, a drive pinion slidably keyed to said drive shaft at one side of the attachment and connected to move with said rod; means located at the opposite side of said attachment between said frame members and between said rod bearings to shift said rod, and means for limiting the sliding movement of said pinion and rod comprising an extension of a shaft bearing to abut the face of said pinion while in driving position and a stop on said rod contacting with one of said rod bearings.

3. In a hoist machine comprising a framework, a drive shaft, a drive pinion, a shifting rod and connections between the rod and pinion, the combination of bearings for said shaft and apertured ears thereon for said rod, and means for locking said parts in inoperative position comprising an aperture in said rod and a pin passing through said aperture and cooperating with one of said ears.

4. In a hoist machine, a framework, a sliding shift rod thereon, means for shifting said rod comprising a lever having a loose connection with the framework at one of its ends, a block upon said rod pivotally connected to said lever at a point intermediate its ends, and means for securing said block to said rod.

5. In a gear shift, the combination of a shift rod and a lever for shifting the same, a block upon said rod having a pivot lug for said lever, and means for securing said block to said rod and said lever upon said pivot lug.

6. A connection between a shift rod and its lever comprising a block bored to receive said rod and having one flat face with a pivot lug projecting therefrom, said lug being provided with a screw threaded channel communicating with the bore of the block, a screw threaded set bolt mounted in said channel, and a nut on said bolt adapted to be screwed into abutting relation with the end of said lug, whereby the nut and set bolt form a lock for the parts.

In testimony whereof I affix my signature.

HARRY S. MYERS.